(12) United States Patent
Ishii

(10) Patent No.: US 6,728,533 B2
(45) Date of Patent: Apr. 27, 2004

(54) CLOCK FOR MOBILE PHONES

(75) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 508 days.

(21) Appl. No.: 09/770,530

(22) Filed: Jan. 25, 2001

(65) Prior Publication Data

US 2002/0098857 A1 Jul. 25, 2002

(51) Int. Cl.[7] .................................................. H04Q 7/20
(52) U.S. Cl. ...................... 455/425; 455/90.1; 455/566; 455/524
(58) Field of Search ............................ 455/435.1, 502, 455/414.2, 556.2, 422.1, 425, 435.2, 456.1, 457, 515, 566, 90.1, 524, 551, 433, 552.1, 550.1

(56) References Cited

U.S. PATENT DOCUMENTS

| | | |
|---|---|---|
| 5,151,932 A | 9/1992 | Arizumi et al. |
| 5,212,810 A | 5/1993 | Maeda et al. |
| 5,258,964 A | 11/1993 | Koma et al. |
| 5,309,500 A | 5/1994 | Koma et al. |
| 5,528,558 A | 6/1996 | Mardhekar et al. |
| 5,818,920 A | 10/1998 | Rignell et al. |
| 5,832,367 A * | 11/1998 | Bamburak et al. ............ 455/62 |
| 5,845,257 A | 12/1998 | Fu et al. |
| 5,920,824 A * | 7/1999 | Beatty et al. ................ 455/550 |
| 6,075,992 A * | 6/2000 | Moon et al. ................ 455/455 |
| 6,246,886 B1 * | 6/2001 | Oliva ........................ 455/553 |
| 6,505,052 B1 * | 1/2003 | Jou ............................. 455/466 |

* cited by examiner

*Primary Examiner*—Nay Maung
*Assistant Examiner*—Tanmay Lele
(74) *Attorney, Agent, or Firm*—Robert D. Varitz, P.C.

(57) ABSTRACT

In a mobile phone having a clock display therein, wherein the mobile phone is in wireless communication with a base station located in a time zone having a current local time (CLT), and wherein the base station transmits a control signal having carried therein at least a universal coordinated time (UCT) signal, a system identification (SID) signal, a network identification (NID) signals, a CLT signal, and a daylight savings time (DST) flag, wherein the mobile phone is transportable to be wireless communications with another base station in another time zone, and wherein, upon securing communications with a base station, the phone synchronizes its internal clock to the CLT of the base station; a clock includes a selection mechanism for use by a user to select a home time zone (HTZ), and to select a displayed time on the clock display from the group of displayed times consisting of CLT and HTZ; and a displayed time calculating mechanism which determines the time displayed on the clock display as a function of the CLT and the HTZ.

10 Claims, 2 Drawing Sheets

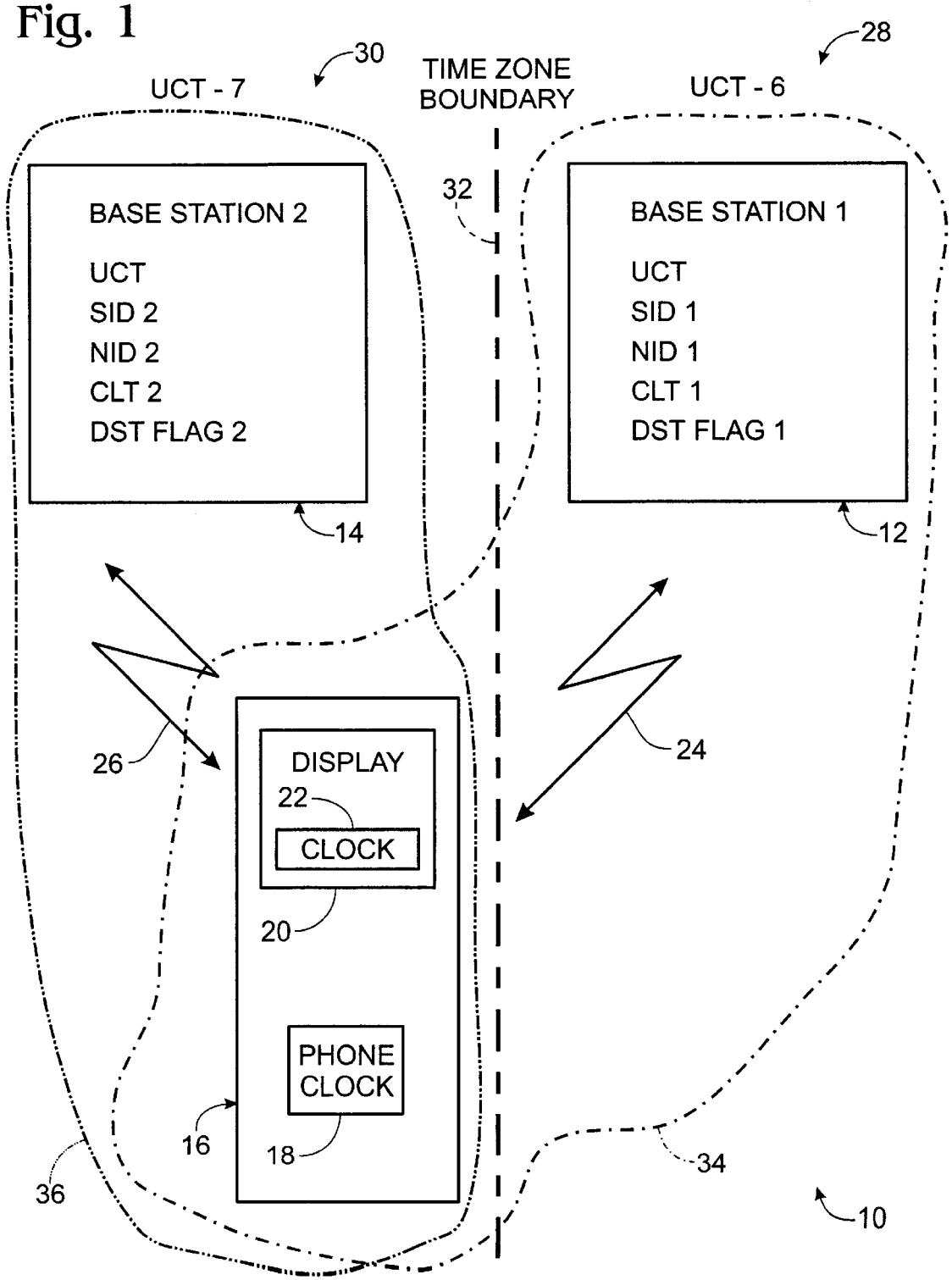

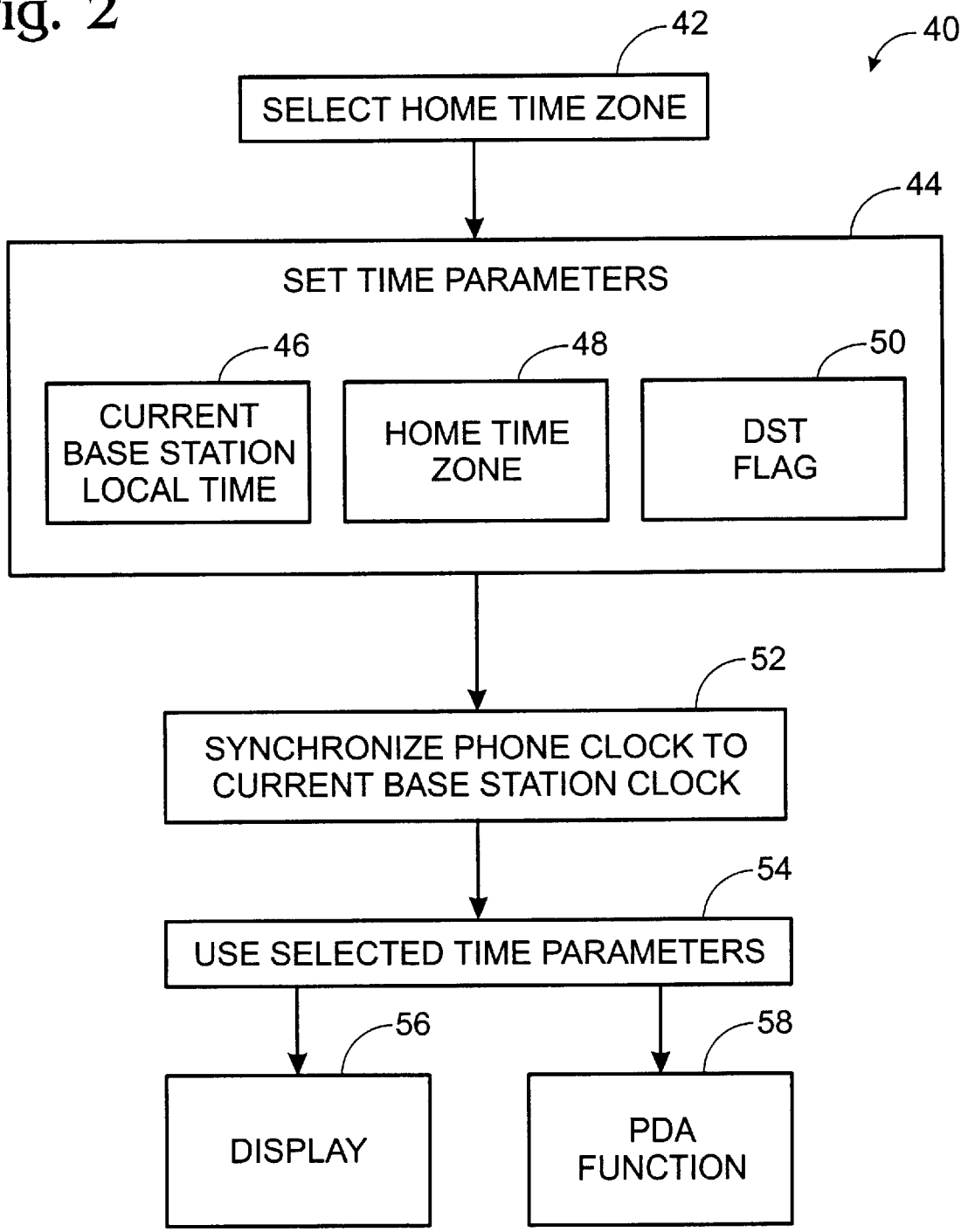

CLOCK FOR MOBILE PHONES

FIELD OF THE INVENTION

This invention relates to mobile communications, and specifically to the provision of a clock in a mobile phone which may be set to a specific time zone setting.

BACKGROUND OF THE INVENTION

Most mobile phones are equipped with a clock. In some digital cellular/PCS systems, such as the IS-95 CDMA system, the in-phone real-time clock is synchronized to the precise local time given by the base station to which the phone is communicating with currently. This feature is known as automatic local time adjustment. Users of such a real-time clock equipped phone do not need to adjust the real-time clock, even when they move to a different time zone.

Automatic local time adjustment, however, may be both confusing and detrimental to users in some instances. When a user and phone are near a time zone boundary, a base station co-located in the user's time zone may drop service, and a base station in the next time zone may pick up service. This would, in conventional phones, change the local time shown on the phone. This may not be a serious problem, but may result in some confusion if the user relies on the phone clock for accurate time. A more serious problem arises if the phone has a personal organizer, or PDA, associated therewith, because events and schedules time-stamped in one time zone may be invalid when the phone is moved to another time zone, or when the time changes erroneously, e.g., the phone and user are near the eastern edge of a time zone and an appointment alert is set to alert the user 30 minutes from the present time. At present time plus one minute, a base station in the other time zone picks up the phone, and changes the time. As a result, the PDA will not alert the user to the appointment, as the PDA will "believe" that the time for the appointment has passed. The known prior art which may be relevant to this invention includes:

Mobile Station-Base Station Compatibility Standard for Dual-Mode Spread Spectrum Systems, TIA/EIA-95-B.

U.S. Pat. No. 5,151,932, to Arizumi et al., for Method and system for selectively communicating with a telephone or a non-telephone terminal through a public telephone network, granted Sep. 29, 1992, describes a communications system which routes an incoming call depending on the time zone of the calling party.

U.S. Pat. No. 5,212,810, to Maeda et al., for Terminal equipment of a vehicle radio telephone system, granted May 18, 1993, describes a system wherein a terminal is automatically locked depending on the time zone to prevent unauthorized use of the equipment.

U.S. Pat. No. 5,258,964, granted Nov. 2, 1993, and U.S. Pat. No. 5,309,500, granted May 3, 1994, both to Koma et al., for Apparatus for displaying time-of-day data adaptively to different time zones, describe methods to determine the local time of day U.S. Pat. No. 5,528,5 58, to Mardhekar et al., for International time indicating system, granted Jun. 18, 1996, describes a method of displaying the time zone of a called party to the caller.

U.S. Pat. No. 5,818,920, to Rignell et al., for Apparatus for controlling communication connections based on local time, granted Oct. 6, 1998, describes a method to notify a caller when a call is transferred to a different time zone.

U.S. Pat. No. 5,845,257, to Fu et al., for System and methods for scheduling and tracking events across multiple time zones, granted Dec. 1, 1998, describes a method of differentiating calls based on types of times, such as "local," "home" and "remote," wherein a user manually specifies the current time zone in use.

U.S. Pat. No. 5,920,824, to Beatty et al., for Method for computing current time on a cellular mobile system, granted Jul. 6, 1999, describes a method to determine the current local time.

U.S. Pat. No. 6,075,992, to Moon et al., for Apparatus and method for automatically handling initiation of a call by a portable intelligent communications device, granted Jun. 13, 2000, describes a method of automatic call handling depending on the time zones of the calling party and the called party.

SUMMARY OF THE INVENTION

In a mobile phone having a clock display therein, wherein the mobile phone is in wireless communication with a base station located in a time zone having a current local time (CLT), and wherein the base station transmits a control signal having carried therein at least a universal coordinated time (UCT) signal, a system identification (SID) signal, a network identification (NID) signals, a CLT signal, and a daylight savings time (DST) flag, wherein the mobile phone is transportable to be in wireless communications with another base station in another time zone, and wherein, upon securing communications with a base station, the phone synchronizes its internal clock to the CLT of the base station; a clock includes a selection mechanism for use by a user to select a home time zone (HTZ), and to select a displayed time on the clock display from the group of displayed times consisting of CLT and HTZ; and a displayed time calculating mechanism which determines the time displayed on the clock display as a function of the CLT and the HTZ.

It is an object of the invention to provide a mobile communications device which will allow a user to maintain a selected time zone setting.

Another object of the invention is to provide a means to allow a user to select either a local time zone or a home time zone to be used in a mobile phone.

A further object of the invention is to provide, in a mobile phone, a mechanism for calculating a home time in a home time zone as a function of the local time given by a base station to which the mobile phone is connected.

Still another object of the invention is to provide a display of events, such as a personal schedule, a call log, etc., with times set by the user-selected time zone.

Another object of the invention is to provide, in a mobile phone, a mechanism for setting a home time zone automatically, as a function of the home system of the phone.

Another object of the invention is to provide a mechanism for notifying a user when more than one time zone may be associated with a home system.

A further object of the invention is to provide a mechanism allowing a user to select a single time zone as the "home time zone" from any possible time zones associated with the home system.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1 is a geographic scenario depicting the problem solved by the invention.

FIG. 2 is a block diagram a preferred embodiment of the invention.

DETAILED DESCRIPTION OF THE PREFERRED EMBODIMENT

In digital cellular/PCS systems, such as the IS-95 CDMA system, a base station broadcasts, on one of several control channels, the current local time, the local time zone and a flag for daylight saving time. A mobile phone attempts to retrieve the foregoing information from a received signal upon establishing physical layer synchronization with the base station, sets the base station local time in the in-phone clock, and then continues to update its local time using timing information generated by the synchronization mechanism. This ensures that the in-phone clock is precisely synchronized to the time maintained by the base station and associated network. As previously noted, when the user and phone are located in a location near a time zone boundary, the base station serving the phone may be located in the next time zone, and the phone may erroneously set its clock to the time of the next time zone, which is different from that of the location of the user and phone.

Referring now to FIG. 1, a representation of the time zone boundary quandary solved by the invention is depicted generally at 10. A system network includes base station 1, 12 and base station 2, 14. A mobile phone 16 includes a phone clock 18 therein, and a display 20, having a displayed clock 22 shown thereon. Control channel signals 24, 26 are transmitted between phone 16 and base station 1 and base station 2, respectively. Control channel signals may include, among other things, a universal coordinated time (UCT) signal, a system ID (SID) signal, a network ID (NID) signal, a current local time (CLT) signal, where CLT is the local time of the time zone in which the base station is located, and a daylight savings time (DST) flag, which indicates whether daylight savings time is in effect for the location of the base station. Base station 1 is in a first time zone 28, which is six hours behind UCT, as determined at the prime meridian, while base station 2 is in time zone 30, which is UCT-7 hours. A time zone boundary 32 extends between time zone UCT-6 and UCT-7. As shown by dash-dot line 34, base station 1 has a coverage area which extends over portions of both time zones, while base station 2 has a coverage area represented by dash-double-dot line 36. Phone 16 is transportable between time zone UCT-6 and time UCT-7, as well as other non-depicted time zones.

As shown in FIG. 1, phone 16 may be in contact with base station 1, the active base station, and may then switch to base station 2, which becomes the active base station, and may continue to switch between base stations, depending on signal strength, other traffic, geographical considerations, etc. Every time phone 16 changes active base stations, phone clock 18 synchronizes with the CLT of the active base station. Phones not incorporating the invention hereof will change the time displayed in displayed clock 22 every time phone 16 changes active base stations.

There are a number of ways in which the foregoing problems may be resolved. The preferred embodiment of the instant invention resolves those problems by adding a number of features to the internal programming of mobile phone 16, the use of which is shown in FIG. 2, generally at 40. Initially, a user is allowed to select a home time zone (HTZ), 42, by means of a selection mechanism incorporated into phone 16. The selection mechanism may take the form of software or hardware. The user then sets time parameters 44, including selecting whether the phone will display the base station current local time (CLT), 46, or the home time zone, 48. The user also sets a daylight savings time (DST) flag 50, to program phone 16 with the information regarding the use of DST in the home time zone for phone 16.

The user may decide to use the phone on either local time zone, determined by a base station, or the home time zone. Phone 16 must still synchronize to the current local time of the active base station, 52, before the phone will indicate any of the selected time parameters, 54. The phone of the invention includes a calculation mechanism which determines the time in the home time zone, based on the local time provided by the current base station, and to display 56 either the local time or the home time, as selected by the user. The phone display will display events, such as a personal schedule, a call log, etc. 58, based on the user-selected time parameters.

The phone is provided with a mechanism to set a home time zone automatically based on the home base system of the phone. The phone of the invention includes a multiple time zone alerting mechanism to alert a user if the phone is located in a region where more than one time zone may be associated with the home service area network. If, for instance, phone 16's usual location is in an area as depicted in FIG. 1, the selection mechanism allows the user to select one of the time zones as the home time zone from any possible time zones associated with the home system. This is accomplished by a multiple time zone discriminator, which is part of the selection mechanism.

An user interface to allows the user to (1) select of home time zone, e.g., the one where the user is usually located, and (2) select whether the home time zone or a local time zone, as acquired from the base station in current communication, is to be used. The user may also enable or disable daylight saving time for the home time zone, for areas that do not observe daylight saving time.

The user selections of time parameters may be stored in the non-volatile memory. If the local time zone is selected, the phone displays the local time in clock 22. If the home time zone is selected, the phone displays the time in the home time zone, computed, after synchronization, using the difference between the local and home time zones. In this case, if the user has disabled daylight saving time, and if the base station sets the flag for daylight saving time, one hour is subtracted from the computed time in the home time zone.

When phone 16 includes a PDA type device, each event associated with time, such as a call log or a scheduled event, referred to herein collectively as PDA events, is time-stamped with the time in a pre-determined time zone, such as UCT, calculated from the local time and the local time zone. When such time is displayed, the phone converts the time in the pre-determined time zone to the one in the selected time zone, i.e., local or home. Phone 16 includes a PDA event controller for controlling the display of PDA events on display 20 at a time according to the user-selected time zone. This feature will prevent the skipping of events, generally scheduled within an hour of the CLT, should the phone go to an active base station in the adjacent, hour earlier time zone.

The home time zone may be automatically set in the phone. Each base station broadcasts its System ID (SID) and Network ID (NID) on one of the several control channels. Each phone is configured with a home SID/NID pair. The current local time zone is the home time zone when the SID/NID pair received from a base station matches the home SID/NID programmed in the phone, and when the base station that provides the SID/NID pair is the same one as provided the current local time.

Normally a SID/NID pair is carried by a regional service area, which includes a number of base stations, there is, therefor, a chance that more than one time zone may be associated with an SID/NID pair. This happens if a service area extends across a time zone boundary. When a phone detects that multiple time zones are associated with its home SID/NID pair, the user interface notifies the user and requires selection of one of the associated time zones as the home time zone.

Thus, a real-time clock for a mobile phone has been disclosed. It will be appreciated that further variations and modifications thereof may be made within the scope of the invention as defined in the appended claims.

I claim:

1. In a mobile phone having a clock display therein, wherein the mobile phone is associated with a home service area network; is in wireless communication with a base station located in a time zone having a current local time (CLT), and wherein the base station transmits a control signal having carried therein at least a universal coordinated time (UCT) signal, a system identification (SID) signal, a network identification (NID) signals, a CLT signal, and a daylight savings time (DST) flag, wherein the mobile phone is transportable to be in wireless communications with another base station in another time zone, and wherein, upon securing communications with a base station, the phone synchronizes its internal clock to the CLT of the base station; a clock comprising:

a selection mechanism for use by a user to select a home time zone (HTZ), and to select a displayed time on the clock display from the group of displayed times consisting of CLT and HTZ; and a displayed time calculating mechanism which determines the time displayed on the clock display as a function of the CLT and the HTZ;

wherein the phone further includes a home time zone setting mechanism to set automatically the home time zone to the home system of the phone.

2. The clock of claim 1 wherein the phone includes a PDA, having PDA events stored therein, and which further includes a PDA event controller for displaying PDA events in the times according to the user selected time zone.

3. The clock of claim 1 wherein the phone includes a multiple time zone alerting mechanism to notify a user if the phone is located in a region where more than one time zone may be associated with the home service area network.

4. The clock of claim 3 wherein said selection mechanism includes a multiple time zone discriminator for allowing a users to select a specific time zone as the home time zone from the possible time zones associated with the home service area network.

5. In a mobile phone having a clock display therein, and also includes a PDA, wherein the PDA has PDA events stored therein, wherein the mobile phone is associated with a home service area network; is in wireless communication with a base station located in a time zone having a current local time (CLT), and wherein the base station transmits a control signal having carried therein at least a universal coordinated time (UCT) signal, a system identification (SID) signal, a network identification (NID) signals, a CLT signal, and a daylight savings time (DST) flag, wherein the mobile phone is transportable to be in wireless communications with another base station in another time zone, and wherein, upon securing communications with a base station, the phone synchronizes its internal clock to the CLT of the base station; a clock comprising:

a selection mechanism for use by a user to select a home time zone (HTZ), and to select a displayed time on the clock display from the group of displayed times consisting of CLT and HTZ;

a displayed time calculating mechanism which determines the time displayed on the clock display as a function of the CLT and the HTZ; and a PDA event controller for displaying PDA events in the times according to the user selected time zone;

wherein the phone includes a multiple time zone alerting mechanism to notify a user if the phone is located in a region where more than one time zone may be associated with the home service area network.

6. The clock of claim 5 wherein the phone further includes a home time zone setting mechanism to set automatically the home time zone to the home system of the phone.

7. The clock of claim 5 wherein said selection mechanism includes a multiple time zone discriminator for allowing a users to select a specific time zone as the home time zone from the possible time zones associated with the home service area network.

8. In a mobile phone having a clock display therein, wherein the mobile phone is associated with a home service area network; is in wireless communication with a base station located in a time zone having a current local time (CLT), and wherein the base station transmits a control signal having carried therein at least a universal coordinated time (UCT) signal, a system identification (SID) signal, a network identification (NID) signals, a CLT signal, and a daylight savings time (DST) flag, wherein the mobile phone is transportable to be in wireless communications with another base station in another time zone, and wherein, upon securing communications with a base station, the phone synchronizes its internal clock to the CLT of the base station; a clock comprising:

a selection mechanism for use by a user to select a home time zone (HTZ), and to select a displayed time on the clock display from the group of displayed times consisting of CLT and HTZ; and a displayed time calculating mechanism which determines the time displayed on the clock display as a function of the CLT and the HTZ;

wherein the phone further includes a home time zone setting mechanism to set automatically the home time zone to the home system of the phone: and wherein the phone includes a multiple time zone alerting mechanism to notify a user if the phone is located in a region where more than one time zone may be associated with the home service area network.

9. The clock of claim 8 wherein the phone includes a PDA, having PDA events stored therein, and which further includes a PDA event controller for displaying PDA events in the times according to the user selected time zone.

10. The clock of claim 8 wherein said selection mechanism includes a multiple time zone discriminator for allowing a users to select a specific time zone as the home time zone from the possible time zones associated with the home service area network.

* * * * *